Feb. 14, 1933.  H. H. HARBECKE  1,897,800
AUTOMATIC CHARGING AND VOLTAGE REGULATING SYSTEM
Filed April 19, 1930
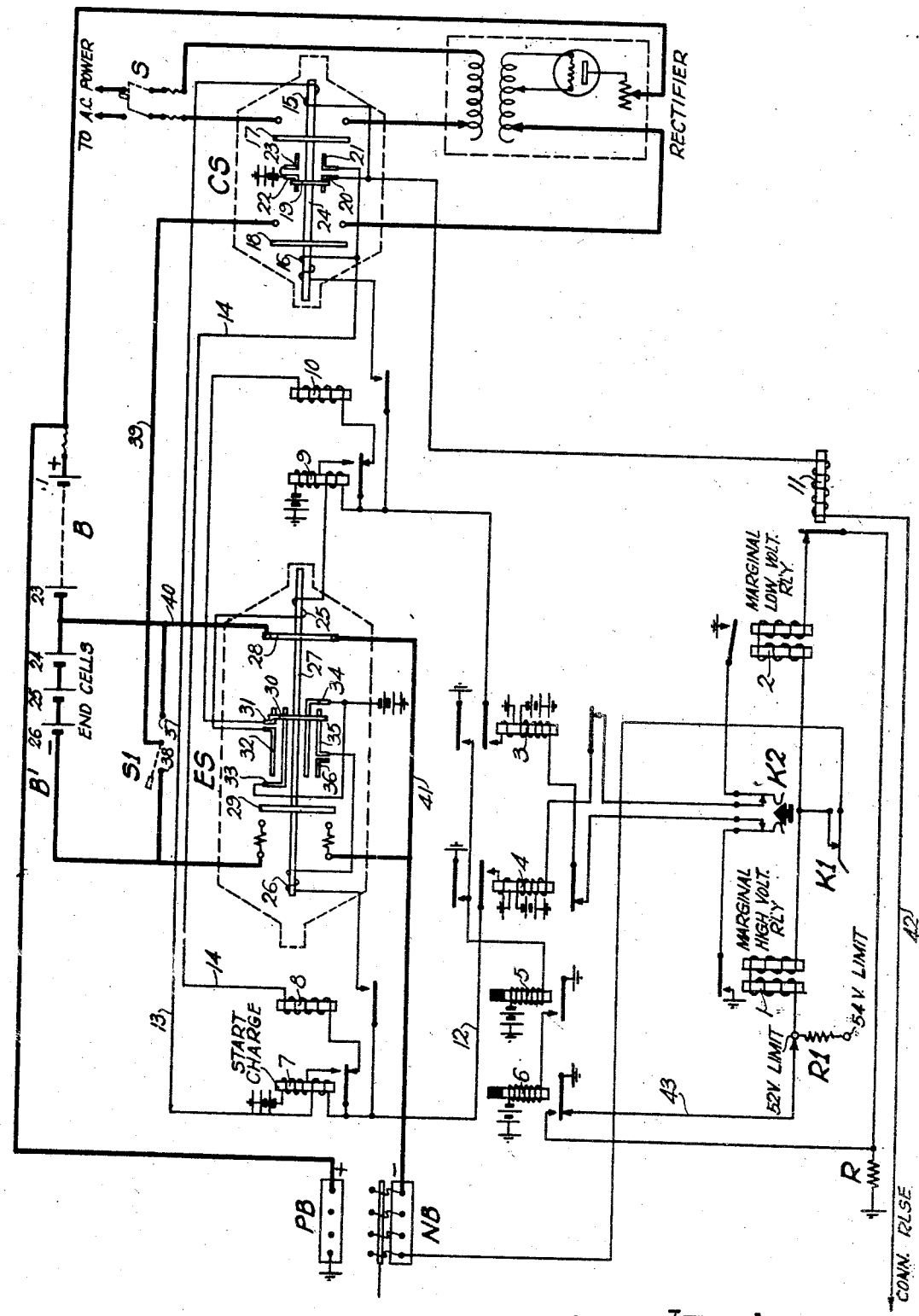
Inventor
Herman H. Harbecke
Atty.

Patented Feb. 14, 1933

1,897,800

UNITED STATES PATENT OFFICE

HERMAN H. HARBECKE, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

AUTOMATIC CHARGING AND VOLTAGE REGULATING SYSTEM

Application filed April 19, 1930. Serial No. 445,555.

The present invention relates to automatic battery charging and voltage regulating systems in general, but more specifically concerns itself with a new and improved method for regulating the charging and the voltage of a battery of 48 volts, such as is commonly employed in an automatic telephone system. This method includes the use of end cells which are automatically cut in or out during the discharging or charging of the storage battery to maintain the voltage delivered to the battery leads constant or within certain high or low voltage limits.

This method with its special features will be described fully hereinafter, reference being had to the accompanying single sheet of drawing forming a part of this specification and in which the system of the present invention is depicted by means of the usual circuit diagrams and symbols.

In the drawing, at B is represented a battery of 48 volts, for instance, comprising 23 cells, with which are associated the three end cells B'. The battery or negative bus bar of the system from which battery current is distributed is shown as NB and the ground or positive bus bar is shown as PB. The battery bus bar NB has its connection with the ungrounded terminal of the battery B by way of conductor 41 and the short-circuiting arm 28 of the end-cell solenoid switch ES, and the conductor 40. When the end cells B' have been connected in series with the battery B, the battery bus bar connection to the ungrounded terminal of the battery is made by way of the short-circuiting arm 29 of the solenoid switch ES.

While in the drawing a plurality of battery connections have been shown, it will be understood that they are preferably the same battery.

At the right side of the drawing is represented a rectifier which is arranged, under normal conditions of operation, to carry the entire exchange load.

Directly above the rectifier is a solenoid switch CS which is adapted to connect the commercial power source to the rectifier and connect the charging circuit to the terminals of the battery B and consequently to the bus bars PB and NB.

To the left of the solenoid switch CS, is represented a second solenoid switch ES, whose function it is to cut in and out of the discharge circuit the end cells B'.

Directly above the solenoid switch ES is a hand-operated double-throw switch S1. Under normal conditions of operations, this switch is in contact with terminal 37 so that the charging lead 39 is normally connected to the ungrounded terminal of the battery B by way of conductor 40. Only when it is desired to charge the end-cells B', which in actual practice occurs approximately once every two weeks, is the switch S1 thrown into engagement with terminal 38.

Below the solenoid switch ES and at the bottom of the drawing, are the two voltage relays 1 and 2, of which relay 1 is the high voltage relay and relay 2 is the low voltage relay. These relays have their windings normally bridged across the discharge circuit of the battery and thereby are controlled according to the voltage in the discharge circuit. The high relay 1 is adjusted to operate only when the voltage of the discharge circuit reaches 52 volts, that is, relay 1 is so adjusted that it will not attract its armature until the voltage of the discharge circuit has reached the prescribed high limit. The low voltage relay 2 is so adjusted that with the resistance element R in its circuit it will maintain its armature attracted when the voltage of the discharge lead remains above the low voltage limit of 46 volts, but, when the low voltage limit is reached, the relay will no longer maintain its armature attracted and the armature will move into engagement with its grounded resting contact.

To start the description of the operation of the present system, it will be assumed that the battery B is carrying the entire exchange load and that the voltage of the battery is within the prescribed low and high voltage limits. With this condition of operation, the equipment is in the position in which it is shown in the drawing.

In time, as discharge of current takes place from the battery B, the voltage thereof will drop to the low limit of 46 volts. When this occurs, the low voltage relay 2 retracts its armature and thereby completes the circuit of relay 4 by way of right-hand contacts of key K2 and resting contact and lower armature of relay 3. Relay 4 operates and at its upper armature completes the circuit for slow-to-operate relay 5, while at its inner upper armature, it completes a circuit from ground through its upper winding and thence by way of conductor 12, lower winding of relay 7, conductor 13, through the right-hand winding 15 of solenoid switch CS, and thence to battery by way of contact 20 in the solenoid switch CS, short-circuiting arm 19 and contact 22. At its lower armature, relay 4 opens the circuit of relay 8 to prevent any possible operation of that relay at this time.

Relay 7 operates in this circuit and at its armature and make contact locks itself through its upper winding in series with the upper winding of relay 4, at the same time opening the circuit of relay 8.

In the solenoid switch CS, the winding 15 energizes in the previously traced circuit and moves the solenoid plunger 24 to the right, thereby connecting the alternating current power supply through the short-circuiting arm 17 to the rectifier, it being assumed that the hand switch S is in the closed position. Movement of the plunger 24 to the right also completes the charging circuit for the battery through the short-circuiting arm 18 and by way of conductor 39, and connects the contacts 21 and 23 together by means of short-circuiting arm 19. The rectifier now commences to function to charge the battery.

Relay 5 operates a short interval after its circuit has been closed by relay 4 and at its armature and make contact completes the circuit for slow-to-operate relay 6. Relay 6 also operates after an interval and at its armature and make contact connects direct ground to the winding of the low voltage relay 2, thereby short-circuiting the resistance element R. Since resistance R is now short-circuited low voltage relay 2 operates and attracts its armature, thereby opening the energizing circuit of relay 4.

The upper winding of relay 4 is such that it does not produce sufficient magneto-motive force to maintain the armatures attracted without the assistance of the lower winding, therefore, when the circuit of the lower winding is opened, relay 4 retracts its armatures. This retraction opens the locking circuit of relay 7 and also the energizing circuit of relay 5. Relay 7 in deenergizing at its armature and resting contact prepares the circuit for relay 8, while relay 5 in deenergizing opens the circuit of relay 6. Thereupon, relay 6 deenergizes and removes the short circuit from about the resistance element R to include that resistance element again in series with the winding of the low voltage relay 2.

The rectifier has been connected to the battery for a sufficient interval of time so that when the resistance element R is again included in series with the winding of the low voltage relay 2, that relay will remain operated unless the battery voltage has not increased enough due to some fault to maintain relay 2 operated. If this occurs, relay 2 again retracts its armature and again operates the relay 4.

This time when relay 4 connects ground through its upper winding to conductor 12, a circuit is no longer completed for the lower winding of relay 7 but is completed through the armature and resting contact of relay 7, through the winding of relay 8, and over conductor 14 to battery, since the short-circuiting arm 19 of the solenoid switch CS has moved out of engagement with contacts 20 and 22 and into engagement with contacts 21 and 23. Relay 8 operates in this circuit and at its armature and make contact completes a circuit parallel to its own through the winding 26 of the solenoid switch ES to battery by way of the switch contacts 34 and 35 and the short-circuiting arm 30 of the solenoid switch ES.

The winding 26 of the solenoid switch ES energizes in this circuit and moves the solenoid plunger 27 to the left and, by means of the short-circuiting arm 29, connects the end cells B' in the discharge circuit. Short-circuiting arm 28 also moves to the left with the plunger 27 and in so doing disconnects the conductors 40 and 41, while at the short-circuiting arm 30, battery is removed from the contact 31 and contact 35 and connected to contacts 32 and 36. It will be noted that during the entire movement of the arm 30 that it is in engagement with contacts 33 and 34. Removal of battery from contact 35 opens the circuit of the solenoid winding 26.

When relay 4 operated, at its upper armature it again completed the circuit for slow-to-operate relay 5 which in turn completed the circuit for slow-to-operate relay 6 as before. Relay 6 again energizes to short-circuit the resistance element R to thereby operate the low voltage relay 2 to open the circuit of the lower winding of the relay 4. Relay 4 again retracts its armatures, as explained, thereupon opening the circuit of relay 8 and the circuit of relay 5. Relay 5 opens the circuit of relay 6 and relay 6 thereupon removes the short circuit from about the resistance element R. Now, however, since the end cells have been included in the discharge circuit, the voltage in the discharge circuit will be above the low limit of 46 volts and, therefore, the low voltage relay 2 will remain operated.

Relays 5 and 6 have been made slow-to-operate to insert between the retraction of their armatures consequent to a drop in the battery voltage in the discharge circuit below the low limit, a time interval of sufficient duration to allow the correction of the low voltage condition by the rectifier before relay 2 is again made dependent on the voltage of the discharge circuit.

No further action takes place until the voltage of the discharge circuit reaches the high limit of 52 volts due to the functioning of the rectifier, to which high limit the high relay 1 is adjusted to operate.

If it should be desired to change the high limit of the battery to 54 volts, the conductor 43, instead of being connected as shown in the drawing, is connected to the lower terminal of the resistance element R1. This will in no way effect the adjustment of high relay 1 since it will receive no more current through the resistance element R1 when the battery voltage is 54 volts than it does when the resistance element is excluded from its circuit and the battery voltage is 52 volts.

When the voltage of the discharge circuit reaches 52 volts with the end cells included therein, the high voltage relay 1 operates and by attracting its armature completes the circuit of the lower winding of relay 3 by way of the left-hand normally engaged springs of key K2 and resting contact and lower armature of relay 4. Relay 3 operates when its circuit is so closed and at its upper armature completes the obvious circuit for slow-to-operate relay 5 and at its inner upper armature connects ground through its upper winding and thence through the lower winding of relay 9 and through the solenoid winding 25 of the solenoid switch ES to battery by way of contacts 32 and 34 and short-circuiting arm 30. Relay 3 at its lower armature opens the energizing circuit of relay 4 to prevent any possible operation of that relay at this time.

Relay 9 operates in this circuit and at its armature and make contact completes a locking circuit for itself through its upper winding. The solenoid switch winding 25 also energizes in the circuit and moves the solenoid plunger 27 and the short-circuiting arms carried thereby to the right, thereby cutting the end cells B' out of the discharge circuit and completing the battery connection of the negative bus bar by way of short-circuiting arm 28. Relays 5 and 6 operate, as previously described, when relay 3 energizes. This time, however, the function of the relay 6 is not to short-circuit the resistance element R, but, to open the circuit of the high relay 1, which relay 1 thereupon de-energizes and opens the circuit of the lower winding of the relay 3. The upper winding of the relay 3 is also such that it produces insufficient magneto-motive force to maintain the armatures in their attracted position without the assistance of the lower winding. Therefore, when relay 1 opens the circuit of the lower winding of the relay 3, the latter relay retracts its armatures to open the circuit of relay 5 and also to open the locking circuit of relay 9. Relay 9 thereupon deenergizes and at its armature and resting contact prepares the circuit for relay 10. Relays 5 and 6 also deenergize in turn and relay 6 again completes the circuit for the high relay 1, which, however, does not operate since the voltage of the discharge circuit has been reduced below the high limit by the removal of the end cells B' therefrom.

With this condition of affairs, the rectifier will be carrying the entire exchange load as it should under normal operating conditions, and no further action takes place until something out of the ordinary takes place.

If an unusually large discharge from the battery B should now take place, occasioned by an unusual exchange load, the low voltage relay 2 would fall back again and complete the circuit for relay 4. Since the solenoid switch CS is operated and charging is taking place, the operation of relay 4 at this stage is followed by the operation of the solenoid switch ES to again include the end cells B' in the discharge circuit.

However, if the discharge from the battery B should decrease instead of increase, the voltage across the terminals of the battery gradually rises to the high limit of 52 volts and the high voltage relay 1 again operates to complete the circuit of relay 3. This time when relay 3 operates, instead of completing the circuit for the lower winding of relay 9, it completes a circuit for the relay 10 by way of armature and resting contact of relay 9 to battery by way of contacts 31 and 34 and short-circuiting arm 30 of solenoid switch ES. Relay 10 thereupon operates and at its armature and make contact completes a circuit for the winding 16 of the solenoid switch CS, in parallel with its own winding, to battery by way of contacts 21 and 23 and short-circuiting arm 19 of the solenoid switch CS.

The winding 16 thereupon energizes and moves the plunger 24 and the contact arms 18, 19 and 17 carried thereby to the left to open the charging circuit and to disconnect the AC power supply from the rectifier. The movement of short-circuiting arm 19 to the left opens the circuit of the winding 16 and again connects battery to contact 20 to prepare the circuit of the winding 15 of the solenoid switch and to prepare a circuit for the relay 11.

The retraction of the armatures of relay 3 is followed by the deenergization of relay 5 and the consequent deenergization of relay 6, which latter relay again connects ground by way of conductor 43 to the winding of the high relay 1. Relay 1 does not operate when ground is so connected since the disconnection of the rectifier reduces the voltage of the discharge circuit a slight amount below the high limit of the relay.

The battery B now carries the exchange load until the voltage thereof drops to 46 volts at which time the cycle of operations just described will again take place. It is unusual for the battery to at any time under normal working conditions to carry the exchange load since it is desired that the charging equipment should do that. To insure that the charging equipment will be running almost continually, it is arranged that when the connector of a switch train in the telephone exchange is released from a connection ground will be applied to the conductor 42 so that if the solenoid switch CS is in the position in which it is shown in the drawing the relay 11 will energize from the ground connected to the conductor 42 by way of battery received through contacts 20 and 22 and short-circuiting arm 19 of the solenoid switch CS. The relay 11 thereupon operates by attracting its armature opens the circuit of the low voltage relay 2 which will function as previously described to complete the circuit of the winding 15 of the solenoid switch CS to operate that solenoid switch to connect the AC power supply to the rectifier and to complete the charging circuit of the battery over the conductor 39. When the switch CS is in its operated position, ground connection to the conductor 42 by the release of a connector in the exchange has no effect upon the relay 11 since there is no battery present upon the contact 20 of the solenoid switch.

From this arrangement, it can be seen that during the day, during which the operating conditions are usually considered as being the normal operating conditions of the exchange, the rectifier is continuously operating to carry the exchange load. Only during the night when the exchange load may become very light is it probable that the battery B will be carrying the exchange load.

If for any reason it is desirable to remove the control of the charging of the battery from the high relay 1 and the low relay 2, this may be done by first operating the key K2 and then the key K1 to open the circuits controlled by these relays and also to open the circuit of the relays themselves.

When it is desirable to charge the end cells B' the knife switch S1 is thrown to the left to connect the charging lead 39 to the contact 38. If this should take place when the end cells are in the discharge lead, the voltage of the discharge circuit would be so increased that the high relay 1 would operate to operate the solenoid switch ES, as described, and thereby remove the end cells B' from the discharge circuit. The end cells B' would now be charged in series with the battery B.

The invention having been thus described, what is new and what is desired to have protected by Letters Patent will be pointed out in the appended claims.

What is claimed is:

1. In a battery charging and voltage regulating system, a storage battery, a discharge circuit therefor, a group of end cells, charging means, a pair of connecting switches, and means operating twice, responsive to a single drop in the battery voltage in said discharge circuit below a predetermined limit, for performing two operations with a definite time interval therebetween; first, the operation of one of said switches to connect said charging means to said battery to charge said battery, and second, the operation of the other of said switches to include said group of end cells in said discharge circuit.

2. In a battery charging and voltage regulating system, a storage battery, a discharge circuit therefor, a group of end cells associated with said battery, a rectifier, connecting means, a relay sensitive to a drop of the battery voltage in said discharge circuit below a predetermined limit for operating said connecting means to connect said rectifier to said battery to charge said battery and to include said group of end cells in said discharge circuit, and a second relay sensitive to a rise of the battery voltage in said discharge circuit while said end cells are included therein for operating said connecting means to exclude said end cells from said discharge circuit, said second relay thereafter sensitive to a rise of battery voltage in said discharge circuit for operating said connecting means to disconnect said rectifier from said battery to stop the charging thereof.

3. In a battery charging and voltage regulating system, a storage battery, a charging circuit and a discharge circuit therefor, a group of end cells associated with said battery, a source of power current, a rectifier, a first solenoid switch, a second solenoid switch, a relay sensitive to a drop in the battery voltage in said discharge circuit below a predetermined limit for operating the first solenoid switch to connect said power current to said rectifier and to connect said rectifier to said charging circuit to charge said battery, and for thereafter operating said second solenoid switch to include said group of end cells in said discharge circuit should the battery voltage fail to increase.

4. In a battery charging and voltage regulating system, a storage battery, a charging circuit and a discharge circuit therefor, a group of end cells associated with said battery, a source of power current, a rectifier, a first solenoid switch, a second solenoid switch, a relay sensitive to a drop in the battery voltage in said discharge circuit below a predetermined limit for operating the first solenoid switch to connect said power current to said rectifier and to connect said rectifier to said charging circuit to charge said battery, and for thereafter operating said second solenoid switch to include said group of end cells in said discharge circuit, and a second relay sensitive to a rise in the battery voltage in said discharge circuit while said end cells are included therein, for operating said second solenoid switch to remove said end cells from said discharge circuit, and thereafter sensitive to a rise in the battery voltage in said discharge circuit for operating said first solenoid switch to disconnect said power current from said rectifier and disconnect said rectifier from said charging circuit to stop the charging of said battery.

5. In a voltage regulating system, a circuit for supplying current from a storage battery, a group of auxiliary cells, a rectifier, means sensitive to a drop of the voltage in said supply circuit below a predetermined low limit for connecting said rectifier to said battery and said supply circuit, whereby said rectifier increases the voltage of said supply circuit above said low limit, said means sensitive to a drop of the voltage of said supply circuit below said low limit while said rectifier is connected to said supply circuit for including said auxiliary cells in said supply circuit.

6. In a voltage regulating system, in combination, a current supply circuit including a storage battery, a rectifier, a group of auxiliary storage cells, a pair of switches, means responsive to a drop in the voltage in said supply circuit below a predetermined minimum for operating one of said switches to connect said rectifier to said supply circuit to thereby increase the voltage thereof above said low limit, said means responsive to a drop in the voltage in said supply circuit below said low limit while said rectifier is connected to the supply circuit for operating the other switch to include said auxiliary cells in the supply circuit.

7. In a voltage regulating system, a circuit for supplying current from a storage battery, a group of auxiliary storage cells, a rectifier, connecting means, a closed bridge circuit across said supply circuit including a relay and a resistor connected in series, the voltage drop across said bridge circuit varying with the variations in the voltage in said supply circuit and said relay being so adjusted that with said resistor in series therewith it will maintain its armature attracted as long as the voltage of said supply circuit remains above a predetermined low limit, operating means responsive to the retraction of said relay armature when the voltage of said supply circuit drops to said low limit for operating one of said connecting means to connect said rectifier to said storage battery and said supply circuit, and other means responsive to the retraction of said armature for short-circuiting said resistor momentarily to momentarily increase the voltage drop across said relay to cause it to retract its armature, said relay thereupon retracting its armature a second time should said rectifier fail to increase the voltage of said supply circuit above said low limit and said operating means being responsive to such second retraction of said armature for operating the other of said connecting means to connect said auxiliary cells in said supply circuit.

In witness whereof, I hereunto subscribe my name this 16th day of April, A. D. 1930.

HERMAN H. HARBECKE.